(12) United States Patent
Muziol et al.

(10) Patent No.: US 8,943,913 B2
(45) Date of Patent: Feb. 3, 2015

(54) FLOW SENSORS HAVING A FLOW DUCT IN THE COVER, AND SENSOR TIP AS INTERMEDIATE PRODUCT

(75) Inventors: Matthias Muziol, Mainhausen (DE); Karlheinz Wienand, Aschaffenburg (DE)

(73) Assignee: Heraeus Sensor Technology GmbH, Hanau (DE)

( * ) Notice: Subject to any disclaimer, the term of this patent is extended or adjusted under 35 U.S.C. 154(b) by 448 days.

(21) Appl. No.: 13/356,967

(22) Filed: Jan. 24, 2012

(65) Prior Publication Data

US 2012/0192619 A1    Aug. 2, 2012

(30) Foreign Application Priority Data

Jan. 28, 2011   (DE) .......................... 10 2011 009 754

(51) Int. Cl.
| | |
|---|---|
| *G01D 11/24* | (2006.01) |
| *G01F 1/69* | (2006.01) |
| *G01F 1/684* | (2006.01) |
| *G01F 1/692* | (2006.01) |

(52) U.S. Cl.
CPC ................. *G01F 1/684* (2013.01); *G01F 1/692* (2013.01)
USPC .... 73/866.5; 73/31.05; 73/204.22; 73/204.25

(58) Field of Classification Search
CPC ......... G01F 1/692; G01F 1/684; G01F 1/688; G01F 1/69
USPC ................. 73/31.05, 204.22, 204.25, 204.26, 73/204.27, 866.5
See application file for complete search history.

(56) References Cited

U.S. PATENT DOCUMENTS

| | | | | |
|---|---|---|---|---|
| 5,057,650 | A | * | 10/1991 | Urushibata et al. ......... 174/88 R |
| 5,148,707 | A | | 9/1992 | Inada et al. |
| 5,207,765 | A | * | 5/1993 | Eiermann et al. .......... 73/204.26 |

(Continued)

FOREIGN PATENT DOCUMENTS

| | | | |
|---|---|---|---|
| DE | 4025644 A1 | 3/1991 | |
| DE | 19530413 C1 * | 4/1997 | .............. G01F 1/692 |

(Continued)

OTHER PUBLICATIONS

English translation of an Office Action issued May 15, 2013 in KR Application No. 10-2012-005817.

(Continued)

*Primary Examiner* — Lisa Caputo
*Assistant Examiner* — Punam Roy
(74) *Attorney, Agent, or Firm* — Panitch Schwarze Belisario & Nadel LLP

(57) ABSTRACT

For mass production of anemometers for EGR systems with hot exhaust gas streams having temperatures up to 200° C. or 300° C., conductors and film resistors are placed onto a bed, and are covered on this bed, e.g. A sensor tip of the flow sensor of the anemometer is made of inorganic materials up to the housing cover. A cable is led into a housing and self-supporting electrical conductors are led through the housing cover. In the housing, leads of the cable are connected to the self-supporting electrical conductors. Using bed profiles passing through the cover, the film resistors are spaced from the housing sufficiently far that the film resistors and the housing are largely thermally decoupled. As an intermediate product, a measurement tip or a sensor bar as part of a sensor tip is made of purely inorganic components, in order to make the mass production efficient.

7 Claims, 4 Drawing Sheets

(56) References Cited

U.S. PATENT DOCUMENTS

| | | | |
|---|---|---|---|
| 5,892,149 A * | 4/1999 | Theuer ................... 73/204.22 |
| 6,297,723 B1 * | 10/2001 | Shoji et al. ..................... 338/28 |
| 6,351,884 B1 | 3/2002 | Damaschke et al. |
| 6,382,023 B1 | 5/2002 | Yonezawa et al. |
| 6,393,907 B1 * | 5/2002 | Yamakawa et al. ........ 73/204.26 |
| 6,502,556 B2 | 1/2003 | Wienand et al. |
| 6,666,578 B2 * | 12/2003 | Gibbs et al. ................ 374/142 |
| 7,345,591 B2 * | 3/2008 | Kayser .................... 340/693.5 |
| 7,469,582 B2 * | 12/2008 | Saito et al. ................. 73/204.22 |
| 7,739,908 B2 | 6/2010 | Wienand et al. |
| 7,963,162 B2 | 6/2011 | Muziol et al. |
| 2006/0080050 A1 * | 4/2006 | Zimmermann et al. ......... 702/53 |
| 2007/0024411 A1 * | 2/2007 | Lang et al. ................. 338/22 R |
| 2009/0282909 A1 | 11/2009 | Wienand et al. |
| 2010/0031742 A1 * | 2/2010 | Muziol et al. ............. 73/204.26 |
| 2010/0170483 A1 | 7/2010 | Wienand et al. |
| 2014/0109664 A1 * | 4/2014 | Wiest et al. ................. 73/204.22 |

FOREIGN PATENT DOCUMENTS

| | | |
|---|---|---|
| DE | 19640058 A1 | 4/1998 |
| DE | 199 53 718 A1 | 5/2001 |
| DE | 10016843 A1 | 5/2001 |
| DE | 102005051182 A1 | 4/2007 |
| DE | 102006030786 A1 | 1/2008 |
| DE | 102008037206 A1 | 3/2010 |
| EP | 1151188 A1 | 11/2001 |
| EP | 2251651 A2 | 11/2010 |
| JP | H07-083717 A | 3/1995 |
| JP | 08-313318 A | 11/1996 |
| JP | 2010-044071 A | 2/2010 |
| JP | 2010-525344 A | 7/2010 |
| WO | 01/42640 A1 | 6/2001 |
| WO | 2007/048573 A1 | 5/2007 |
| WO | 20081000494 A2 | 1/2008 |
| WO | 2008/131890 A2 | 11/2008 |

OTHER PUBLICATIONS

EP Search Report issued Jul. 31, 2012 in EP Application No. 12000312.4.

Office Action issued Jun. 6, 2011 in DE Application No. 102011009754.6.

English translation of an Office Action issued Nov. 28, 2013 in KR Application No. 10-2012-0005817.

* cited by examiner

FLOW SENSORS HAVING A FLOW DUCT IN THE COVER, AND SENSOR TIP AS INTERMEDIATE PRODUCT

BACKGROUND OF THE INVENTION

The present invention relates to hot film anemometers particularly for exhaust gas recirculation (EGR) systems. A hot film anemometer determines the mass of the mass flow, for example an exhaust gas flow, via the energy consumption of a resistance layer arranged on a substrate in a mass flow. For the more precise controlling of an EGR, two resistors thermally decoupled from one another are introduced into the exhaust gas flow. For this purpose, this flow sensor is fastened to an exhaust gas channel. In and on the exhaust gas channel, the flow sensors are exposed to temperatures between 200° C. and 300° C. For use in this temperature range, a sensor tip is provided made of inorganic materials.

An anemometer has two heating resistors thermally decoupled from one another, or has one heating resistor and one measuring resistor according to European patent application publication EP 1 151 188 A0.

For the self-cleaning of a flow sensor element in which a temperature measuring element and a heating element are arranged on a carrier element, according to German published patent application DE 10 2005 051 182 A1, the temperature measuring element is heated with an additional platinum thin-film resistor.

German published patent application DE 10 2006 030 786 A1 and International patent application Nos. WO 2007/048573 A1, and WO 2008/000494 A2 disclose flow sensors in which electrical cables lead into a metal pipe, which is sealed by a cover into which film resistors are plugged.

With an arrangement of a film resistor in an exhaust pipe or exhaust gas recirculation pipe according to International patent application publication No. WO 2008/131890 A2, the film resistor is fastened in a carrier, which is sealed against a shielding (4a) or a housing (4b), which is connected tightly to the exhaust pipe or exhaust gas recirculation pipe, and is wherein the carrier (3) and the shielding or the housing are sealed against one another radially outside the exhaust pipe or exhaust recirculation pipe at a distance therefrom. German published patent application DE 10 2008 037206 A1 discloses an anemometric measuring device in an exhaust recirculation pipe, in which a ceramic carrier, on which film resistors are fastened, is embedded in an injection-molded housing made of plastic, wherein the electrical connection is led through the injection molding and sealed and fastened inside the injection-molded part.

BRIEF SUMMARY OF THE INVENTION

An object of the present invention is an easily reproducible mass production of anemometers for EGR systems, which are immersed in exhaust gas streams that reach temperatures of up to 200° C., and in particular up to 300° C.

In order to achieve this object, electrical conductors and film resistors are placed on a bed, for example a ceramic profile, and are covered on this bed, for example through the application and firing of glass paste.

This is significantly more efficient than plugging film resistors, with their thin connecting wires made of platinum, into the cover.

For the mass production of flow sensors, in particular hot film anemometers, whose sensor tip extends to the housing cover made of inorganic materials, for example oxides such as aluminum oxide, magnesium oxide, or spinel, according to the present invention a cable is led into a housing and self-supporting electrical conductors are led through the housing cover. In the housing, leads of the cable are connected to the self-supporting electrical conductors, and the housing is subsequently sealed with the housing cover.

Using the bed profiles leading through the cover, the film resistors are spaced from the housing far enough that the film resistors and housing are largely thermally decoupled, so that the measurement precision is not impaired. Here, the film resistors are preferably equipped with connecting wires. The electrical conductors are more easily connected to connecting wires than to contact surfaces of the film resistor.

The present invention enables the efficient connection of electrical conductors to a carrier or to a bed, and the covering of these electrical conductors lying on this carrier or bed.

Therewith, a sensor tip or a sensor bar, as part of a sensor tip, is also provided. The bed is first of all a support for the electrical conductors and becomes a carrier of the electrical conductors embedded thereon and film resistors fastened thereon. Profiles, in particular ceramic profiles, have proven effective as beds. Firing of glass paste or glass ceramic paste has proven effective for the embedding. During the firing, organic components, in particular of the paste, are volatilized, so that a sensor bar or a sensor tip is created made of purely inorganic components. In a preferred sensor tip, the electrical conductors of the sensor bar are guided through a cover. Between the cover and the film resistor, the electrical conductors are sealed airtight on the bed. This sealing protects the electrical conductors from corrosion by ambient air.

The bed, as carrier of the film resistors, together with the connecting wires of the film resistors fastened thereto and protruding at one end and the electrical conductors embedded and protruding at the other end, appears similar to a miniaturized stretcher used for transporting sick people.

The sensor tip made of inorganic materials contains at least one heating resistor, which is connected to self-supporting electrical conductors, which lead through a housing cover.

In the housing, between the bed and the contacting at the contacts to which the leads of a connecting cable are connected further back, the self-supporting conductors bridge a stretch without a carrier. Due to their large cross-section, the self-supporting conductors maintain their position during production and under vibrational load during operation. The sensor tip, including a heating resistor formed as a film resistor, the self-supporting electrical conductors connected to this heating resistor, and the carrier or carriers to which the self-supporting electrical conductors are affixed, withstands, due to the inorganic materials, the thermal loads of the heating resistor in the gas flows reaching 300° C.

If the covers are to be exposed to gas flows reaching temperatures of up to 300° C., due to the additional heat output of the sensors, they are made of inorganic material such as ceramic. These are indeed more expensive than plastic covers that withstand gas flows having a temperature of 200° C., but have the advantage that they do not wear away so quickly during precise measurements of the mass of gas flows at 300° C., in particular exhaust gases. Therefore, covers made of inorganic material, in particular ceramic covers, have proven effective for the measurement of the flow of gases having a temperature above 200° C.

Simple covers are disc-shaped. Preferred covers are plate-shaped or hat-shaped, with an annular edge.

The housing is held together with the cover by a flange. Two seals are arranged between the housing and cover, in order to seal the housing against the surrounding environment and the gas flow.

In order to secure the conductors and their connection to the leads, two cross-bolts with a beveling at the front are pressed in from the side, between the individual leads and a cross-bore. In this way, tensile forces on the cable do not act on the connection of the leads to the contacts, which in turn would transfer these tensile forces to the carrier-free stretch bridged by the self-supporting electrical conductors inside the housing, and thus these forces also do not further act on the embedding up to the fine connecting wires of the film resistor.

The conductors are wires or strips made of nickel, nickel alloy, or steel, in particular stainless steel. In order to save space, strips can also be placed on edge next to one another, enabling a maximization of the number of conductors that can be placed next to one another in a series on a bed. The connecting wires of the film resistors are made of platinum, or have a platinum cladding, in particular surrounding a nickel core. Film resistors include a variety of platinum thin-film resistors, in particular each sensor having two heat conductors and two temperature sensors.

The self-supporting electrical conductors are connected to film resistors outside the housing. Between the film resistors and the duct through the cover, the electrical conductors are covered on a bed.

The self-supporting electrical conductors are completely covered in the region between a film resistor and a duct in the cover. The conductors then protrude from the housing directly onto the bed on which they are sealed. At the other end of the bed, they are connected to the film resistor or resistors.

A mass production of sensor tips as an intermediate product makes the overall process of sensor production more efficient. Because all the parts of the sensor tip are made of inorganic materials, heat treatments do not require any protective measures for the heat-sensitive components of the sensor, because these are processed separately from the tip. Thus, as a heating resistor, a film resistor is connected to the self-supporting electrical conductors guided through a housing cover with no danger to heat-sensitive material.

According to the present invention, the self-supporting electrical conductors are covered on a bed in the region between a film resistor to which they are connected and a cover duct, through which they protrude after having been guided through the housing cover.

This enables the use of pre-manufactured sensor tips for the mass production of flow sensors, in particular hot film anemometers, in which leads of a cable are connected to self-supporting electrical conductors in a housing, and the cable is led out from the housing and the self-supporting electrical conductors are led through a cover of the housing.

Thus, according to the present invention, the self-supporting electrical conductors are connected to film resistors outside this housing, and are covered on a bed between the film resistors and the duct through the cover.

The flow sensor, in particular its tip, is used to control an EGR system, in which a heating resistor is a film resistor for whose contacting in a housing leads of a cable are connected to self-supporting electrical conductors, the cable is led out from the housing, and the self-supporting electrical conductors are led through a cover of the housing. Because the self-supporting electrical conductors are covered on a bed in the region between a film resistor to which they are connected and a cover duct through which they protrude out from the housing, they are protected from the harmful exhaust gases that flow past the sensor tip. The tip in turn protects the heat-sensitive parts of the sensor from the heat of the exhaust gas and the heat output of the heater or heaters in the sensor tip.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
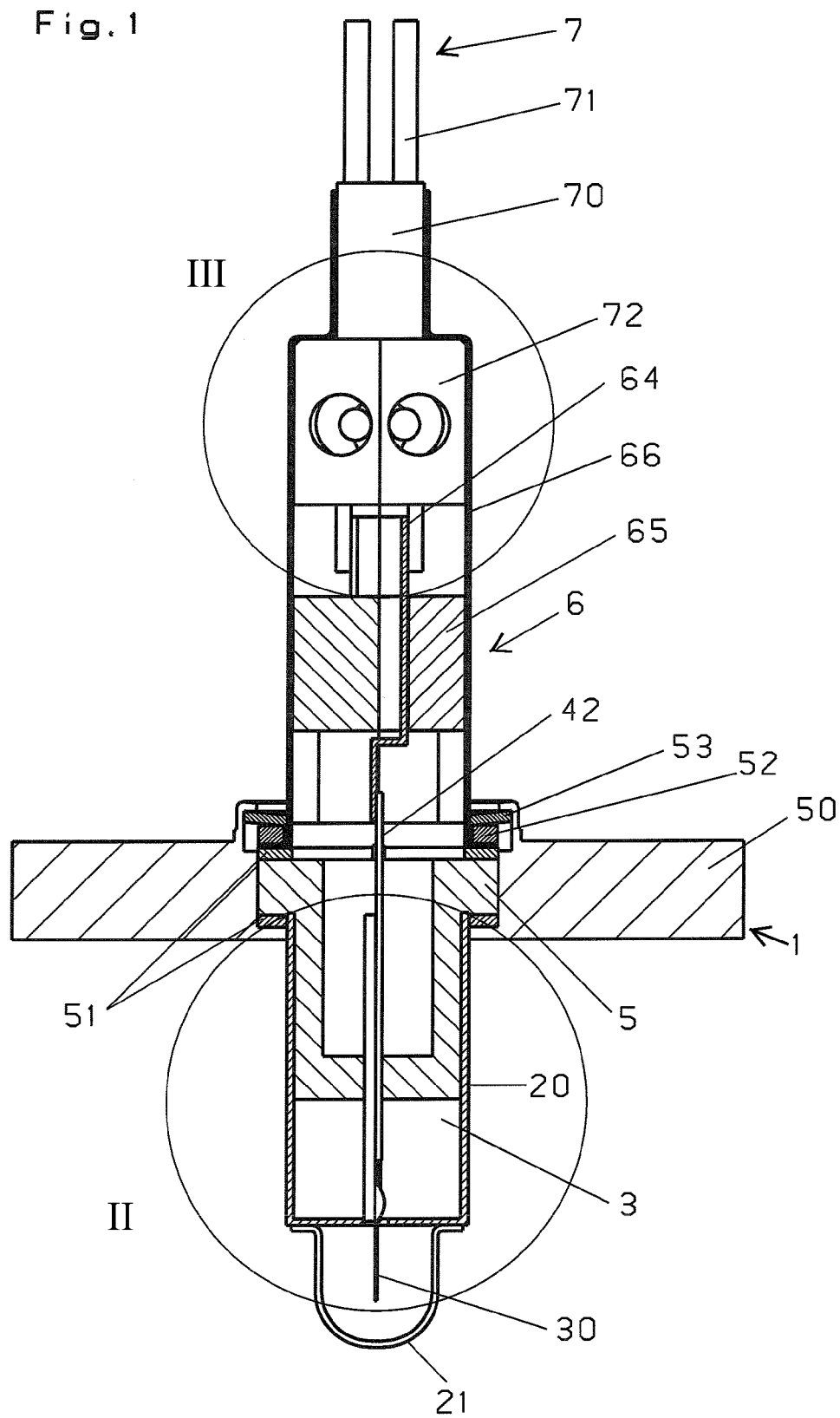
FIG. 1 is a sectional elevation view of a flow sensor according to an embodiment of the invention.
Figure 2:
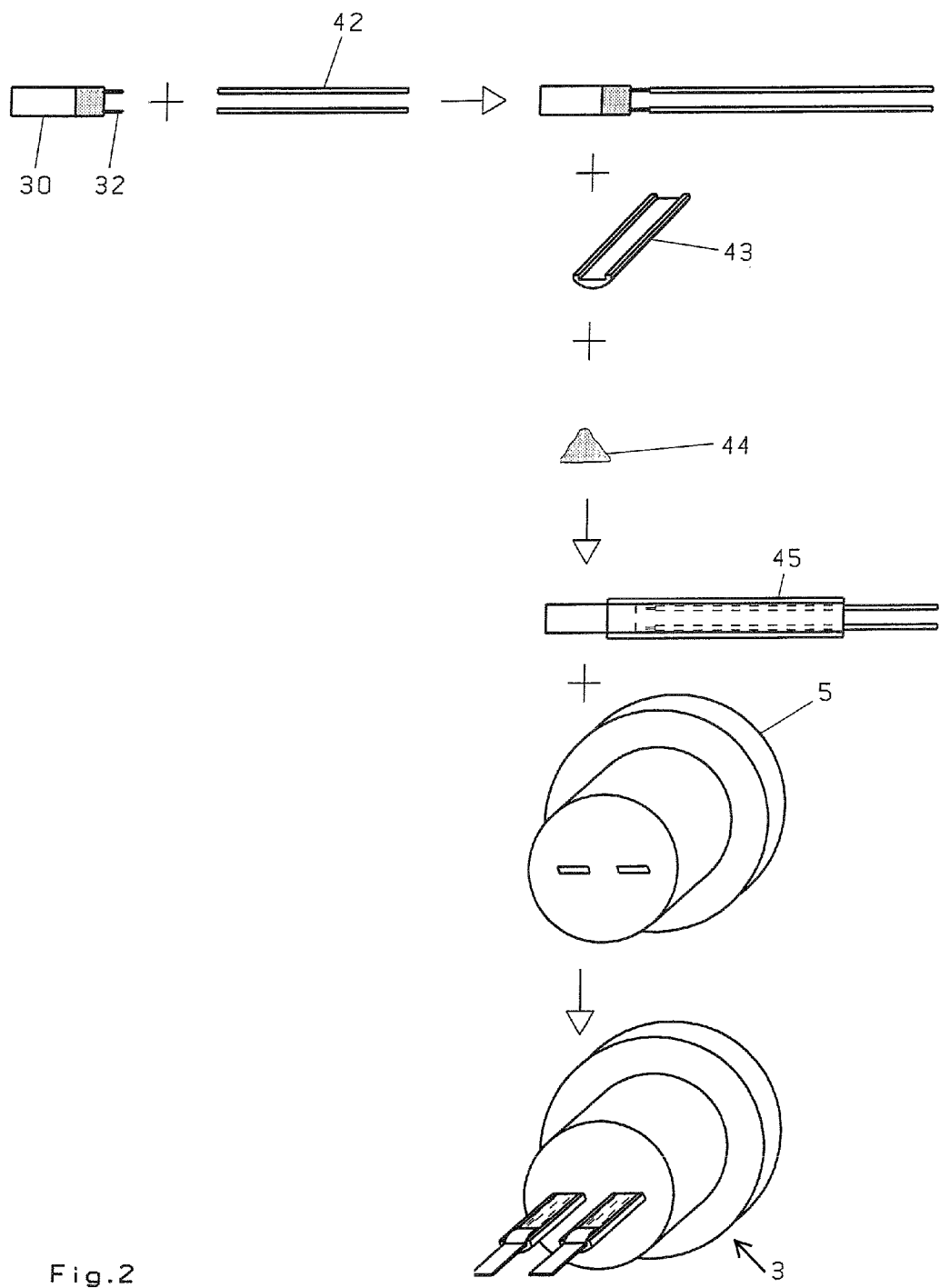
FIG. 2 is a flow diagram showing the production of a sensor tip according to detail section II of FIG. 1.
Figure 3:
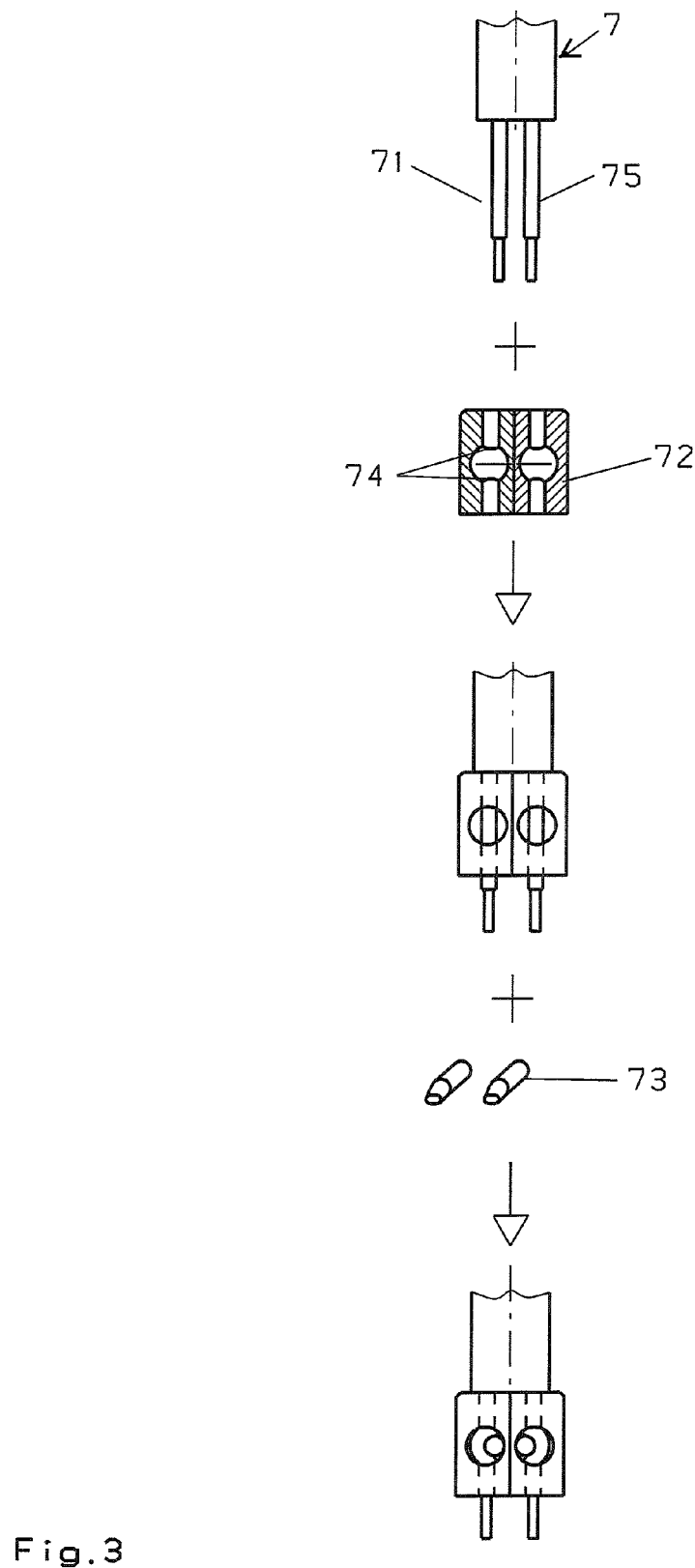
FIG. 3 is a flow diagram showing the fastening steps for the connecting cable in the housing according to the detail section III of FIG. 1.
Figure 4:
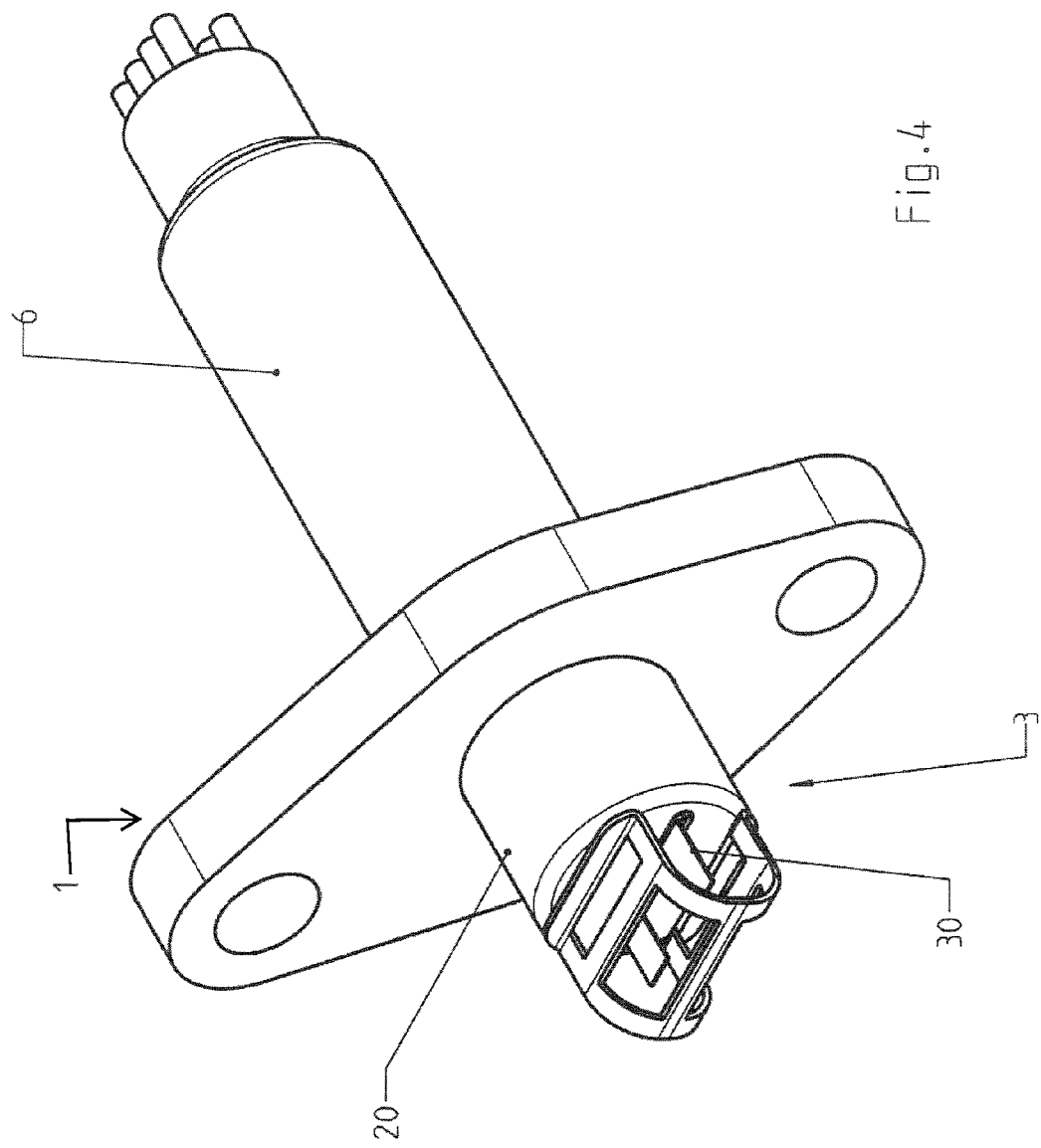
FIG. 4 is perspective view of a flow sensor according to an embodiment of the invention.

FIG. 1 shows a sensor having a sensor tip 3 according to FIG. 2, and according to a cable fastening shown in FIG. 3.

Sensor tip 3 is assembled as shown in FIG. 2. For this purpose, the connecting wires of a film resistor 30 are connected electrically to self-supporting conductors 42, e.g. nickel strips or stainless steel strips. Approved connecting wires 32 of film resistors 30, made of platinum or having platinum cladding, are formed short and thin in order to keep platinum consumption low. The minimum length is determined by the efficient workability and the minimum diameter is determined by the desired mechanical strength. The influence of the connecting wires 32 on the measurement increases with their resistance, so that these wires should also be made as short as possible. The lengthening of the thin film resistor wires with stronger conductors, in particular made of stainless steel, provides a low conductor resistance even over greater distances and a stable positioning of conductors 42 during further assembly.

Conductors 42 on the film resistor are then placed onto a bed profile 43 and are affixed tightly thereto with glass compound 44. For this purpose, glass paste is applied onto bed 43 in such a way that conductors 42 are covered. Bed profile 43 is a carrier on which conductors 42 are affixed, the profile improves stability, and thereby has the function of a bed 43. The applied glass paste is fired at a temperature high enough that after the firing process, during cooling the conductors detach from the fixing compound surrounding them due to their higher coefficients of expansion. This results in a gap between the conductors and their embedding 44, which protects against material fatigue during use of the sensor due to the different coefficients of expansion of the conductors and the insulation. One or two sensor bars 45 produced in this way are placed into a housing cover 5. In this way, a measurement tip 3 is provided that can easily be pre-manufactured. For this reason, in a final step in mass production the sensor can be produced very efficiently by fastening the sensor tip onto the housing thereof.

For this purpose, according to FIG. 1 measurement tip 3 is placed into flange 50 with two seals 51. The completing of external housing 6 takes place with sleeve 66. Sleeve 66 has an edge that lies against upper seal 51. The edge is pressed onto the seal via a pressure ring 52 and a plate spring 53 acting thereon, by beading the edge of flange 50.

The housing 6 is sealed at the cable side by introducing a connecting cable 7 into a pipe, in particular a deep-drawn metal sleeve 66. The sleeve 66 represents the rear part of the housing between the flange and the connecting cable. Via a cable bushing 70 connecting cable 7 seals housing 6 in the cable-side segment of sleeve 66. The mechanical fixing of the cable takes place via stress relief unit 72.

The connecting cable 70 is connected electrically to contacts 64, which are cast in the insulator 65 made of plastic so as to be mechanically stable and electrically insulated from one another. Toward the sensor tip, self-supporting conductors 42 are contacted with contacts 64.

In order to protect the sensors from mechanical damage, the protective cap 20 with the protective bow 21 is welded to the flange 50.

According to FIG. 3, on the side of housing 6 opposite sensor tip 3, the leads 71 are pushed into longitudinal bores of stress relief unit 72 arranged in housing 6. Two cross-bolts 73 with a bevel at the front are pressed in from the side, transverse to lead 71, into the intermediate space between individual lead 71 and the cross-bore. In this way, individual lead 71 comes to be situated in a stress relief loop, and individual lead insulation 75 is additionally indented by sharp edges 74 due to the crossing of the longitudinal bore and the cross-bore, and is held fast in this way with a positive connection against pulling and twisting. Along with this, this type of stress relief secures individual leads 71 in the smallest space against twisting and pulling out. By laying a plurality of leads 71 next to one another in bores, with a correspondingly longer bolt, multiple stress relief units can be realized. This miniaturization with high stability enables an efficient mass production. Decisive for this is the high degree of order due to leads 71 lying next to one another, which makes it possible to provide 3 to 12, in particular 4 to 10, leads 71 with stress relief easily and efficiently in a single step.

The left and right leads 71 in FIG. 3 preferably each stand for rows of leads, e.g. consisting in each case of three or four leads, arranged one behind another in a series.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for mass production of flow sensors (1) having a sensor tip (3) made of inorganic material up to a housing cover (5) and including a heating resistor formed as a film resistor (30), self-supporting electrical leads (42) connected to the heating resistor, and carriers on which the self-supporting electrical leads (42) are fixed, wherein a cable (7) leads into a housing (6) and the self-supporting electrical leads (42) lead through the housing cover (5), the method comprising: connecting cable leads to the self-supporting electrical leads (42) in the housing (6), subsequent to the connecting closing the housing (6) with the housing cover (5), and pressing a bolt, having an introducing bevel at the front, transversely, to one of the cable leads, into an intermediate space between the one of the cable leads and a cross-bore.

2. The method according to claim 1, wherein the housing (6) is held together with the cover (5) by a flange (50).

3. The method according to claim 1, wherein the self-supporting electrical leads (42) are connected outside the housing (6) to film resistors, and the self-supporting electrical leads are covered on a bed (43) between the film resistors (30) and a duct through the cover (5).

4. A sensor tip (3) made of inorganic materials, comprising: a heating resistor formed as a film resistor; self-supporting electrical leads (42) connected to the heating resistor and leading through a housing cover (5), wherein the self-supporting electrical leads (42) are covered on a bed (43) in a region between the film resistor (30) to which the self-supporting electrical leads (42) are connected, and a cover duct through which the self-supporting electrical leads (42) protrude from the housing (6); and a bolt pressed, transverse to a cable lead connected to the self-supporting electrical leads, into an intermediate space between the cable lead and a cross-bore.

5. A method for mass production of sensor tips having parts made of inorganic materials and a film resistor formed as a heating resistor, the heating resistor being connected to self-supporting electrical leads (42) which are led through a housing cover (5), the method comprising: covering the self-supporting electrical leads on a bed (43) in a region between a film resistor (30) to which the self-supporting electrical leads are connected and a cover duct through which the self-supporting electrical leads protrude after the self-supporting electrical leads have been led through the housing cover, and pressing a bolt, having an introducing bevel at the front, transversely to a cable lead connected to the self-supporting electrical leads, into an intermediate space between the cable lead and a cross-bore.

6. A flow sensor (1) for an exhaust gas recirculation, comprising a heating resistor in a form of a film resistor (30), cable leads connected to self-supporting electrical leads for connecting the film resistor in a housing, wherein the self-supporting electrical leads (42) lead through a cover (5) of the housing (6), and wherein the self-supporting electrical leads (42) are covered on a bed (43) in a region between the film resistor (30) to which they are connected and a cover duct through which they protrude from the housing (6), and a bolt pressed, transverse to a cable lead connected to the self-supporting electrical leads, into an intermediate space between the cable lead and a cross-bore.

7. The flow sensor (6) according to claim 6, wherein the leads (42) passing through the cover are connected to connecting wires (32) of the film resistor (30).

* * * * *